Sept. 16, 1958  A. H. JOBERT ET AL  2,851,890

UNIVERSAL CAM MECHANISM

Filed July 30, 1953  3 Sheets-Sheet 1

INVENTORS
ARTHUR H. JOBERT
RUDOLPH C. GOCHT
BY
Mitchell & Beckert
ATTORNEYS

Sept. 16, 1958     A. H. JOBERT ET AL     2,851,890
UNIVERSAL CAM MECHANISM
Filed July 30, 1953     3 Sheets-Sheet 2
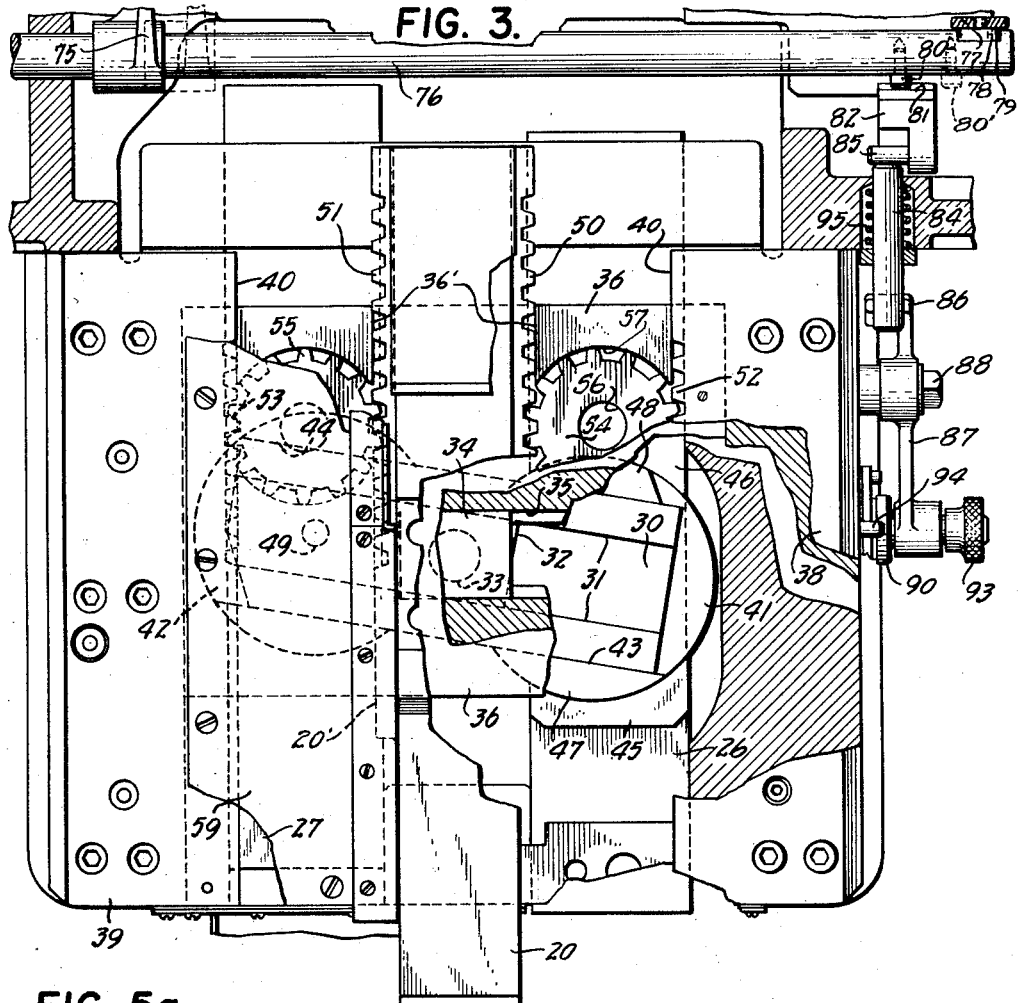
FIG. 3.
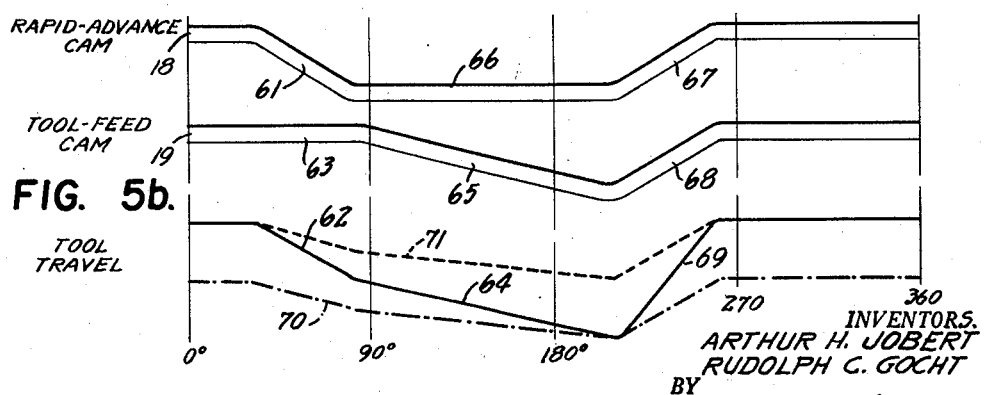
FIG. 5a.
FIG. 5b.
INVENTORS.
ARTHUR H. JOBERT
RUDOLPH C. GOCHT
BY Mitchell & Bechert
ATTORNEYS Sept. 16, 1958   A. H. JOBERT ET AL   2,851,890
UNIVERSAL CAM MECHANISM
Filed July 30, 1953   3 Sheets-Sheet 3
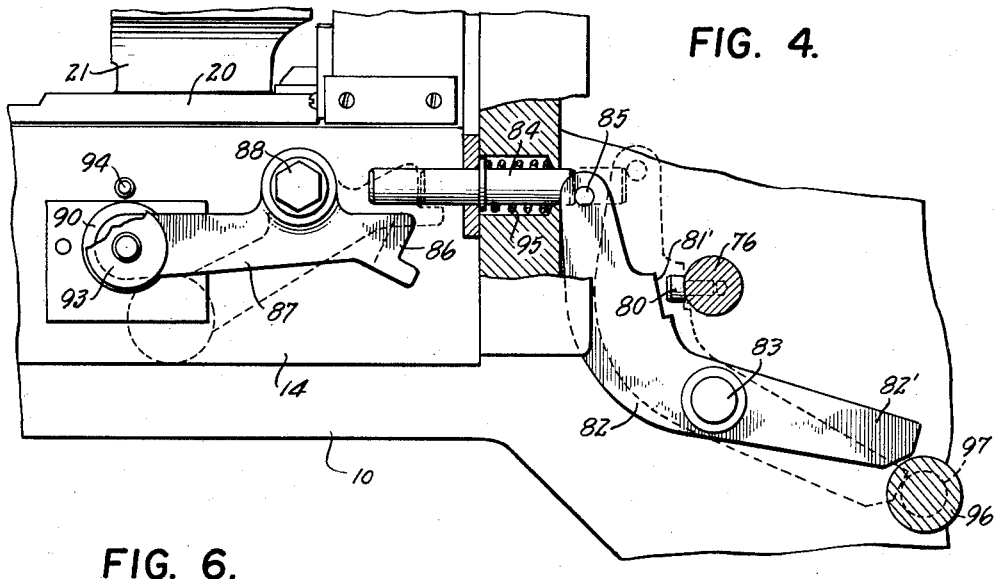
FIG. 4.
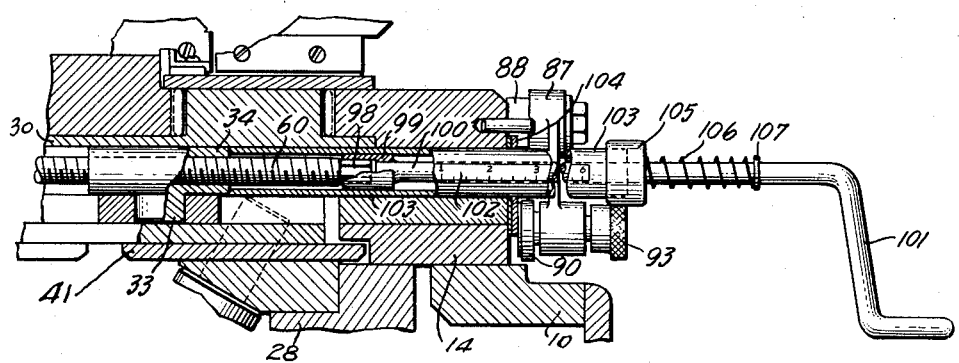
FIG. 6.
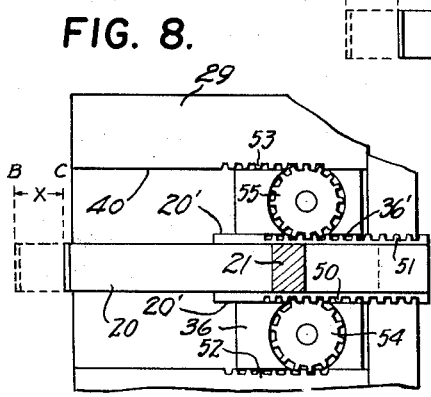
FIG. 7.
FIG. 8.
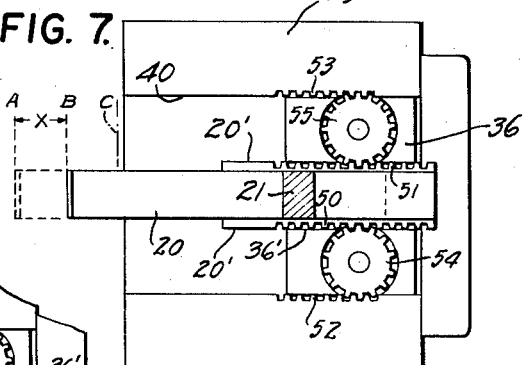
INVENTORS
ARTHUR H. JOBERT
RUDOLPH C. GOCHT
BY Mitchell & Bechert
ATTORNEYS

United States Patent Office 2,851,890
Patented Sept. 16, 1958

2,851,890

UNIVERSAL CAM MECHANISM

Arthur H. Jobert, New Britain, and Rudolph C. Gocht, Newington, Conn., assignors to The New Britain Machine Company, New Britain, Conn., a corporation of Connecticut Application July 30, 1953, Serial No. 371,362

7 Claims. (Cl. 74—110)

Our invention relates to improvements in slide mechanisms and, in particular, to end-tool slide mechanisms for machines such as lathes, multiple-spindle screw machines, and the like. This invention incorporates certain improvements over the disclosure in U. S. Patent No. 2,369,039 to Rudolph C. Gocht.

It is an object of the invention to provide improved slide-feeding means for machines of the character indicated.

Another object is the provision of relatively simple means for adapting a machine of the character indicated to a wide variety of uses without the necessity of changing slide-feeding cams.

It is also an object to provide improved readily adjustable means for establishing the proper tool-feeding speed for any desired turning speed.

A further object is to provide selective control of jump-feeding and work-feeding programs in a feeding cycle for a slide in a machine of the character indicated.

Still another object is to provide symmetry in the application of feeding forces to a tool slide served mechanism meeting the above objects.

It is also an object to provide a safety lock-out mechanism for assuring that the cams or other basic programming elements for driving our improved slide-feeding mechanism will not be driven as long as an adjustment is being made in our slide-feeding mechanism; conversely, it is an object to provide such safety lock-out mechanism to prevent access for adjustment of our slide-feeding mechanism as long as the cams or other programming elements are being driven.

It is a further object to provide improved readily accessible means for adjusting the range of operation of our slide feed mechanism without changing the relationship of jump feeding to work feeding.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

Fig. 3 is a plan view of the mechanism of Fig. 2, with certain parts broken away and in section;

Fig. 4 is an enlarged fragmentary side elevation of safety lock-out parts, shown partly in Figs. 1 and 3;

Figs. 5a and 5b are graphical diagrams illustrating slide-feeding functions with the mechanism of Figs. 1 to 3;

Fig. 6 is a fragmentary view in vertical section in the sectional plane depicted in Fig. 1, but illustrating an adjusting function; and Figs. 7 and 8 are simplified plan views of alternative connections of feed-multiplying means in our feed mechanism.

Figure 1:
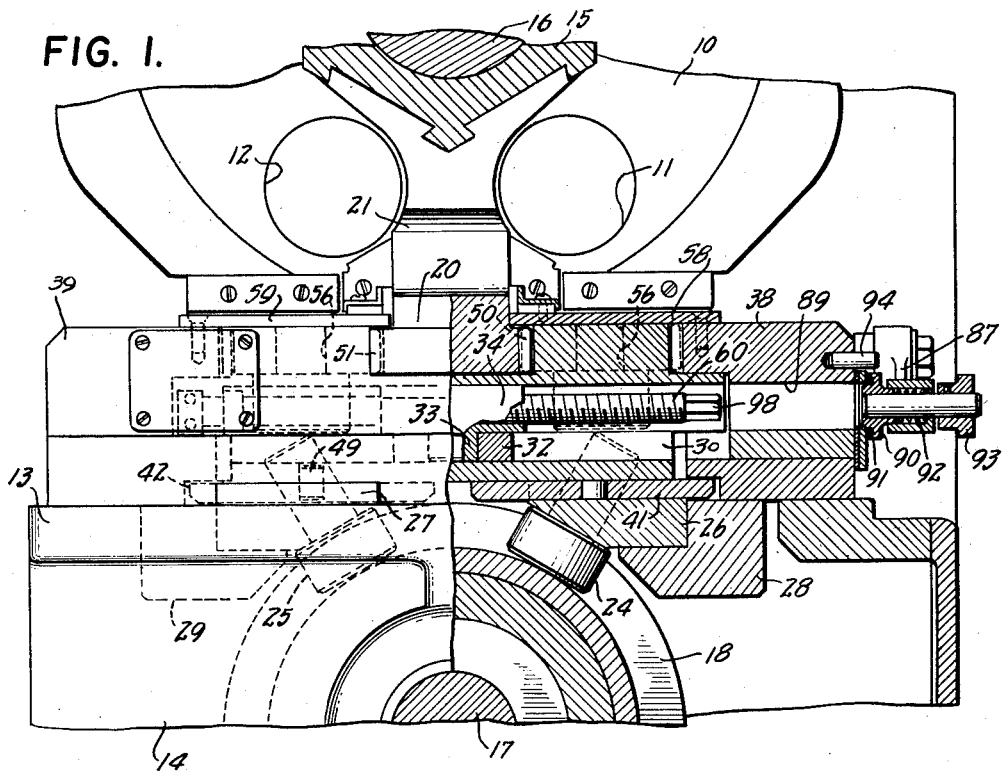
Fig. 1 is an end elevation in partial section of a portion of a conventional multiple-spindle screw machine having a tool slide operated by a device illustrative of the invention.

In the said Gocht patent, means are disclosed for obtaining a variety of jump and feed strokes for driving a tool slide, all from one standard jump-and-feed motion-generating mechanism. By means of adjustable linkages intermediate the jump-and-feed mechanism and the tool slide, the respective transmitted effects of the jump and feed may be varied as desired within the limits of the total stroke obtainable.

The present invention seeks to extend the utility and safety of a mechanism of the type described in the said Gocht patent. Specifically, means are provided for assuring complete symmetry of feed-thrust development, so that greater thrust forces may be transmitted in a given size mechanism, and so that greater precision of feed translation may be effected. In order to extend the range of application, the present invention also provides means whereby the total travel of the slide-feeding means may be caused to take place for various longitudinal ranges without in any way affecting a given adjusted relationship between jump-feed and work-feed components of the feeding stroke. As a safety feature, we further provide automatic lock-out connections between the adjustable elements of our slide-feed means and the clutching means to the camshaft from which the slide-feeding means derives its basic feed, thus assuring that the cams cannot drive the tool-slide mechanism as long as an adjustment is being made and, at the same time, assuring that an adjustment cannot be made in our mechanism if drive means for the camshaft is clutched in. The lock-out connections may also serve to lock out the hand-crank mechanism so that it becomes impossible to crank the machine by hand if the adjustable elements for the slide-feeding means are engaged for adjustment; the same lock-out connections may also serve to lock the adjustable elements against displacement when the hand-crank mechanism is engaged.

In the form shown, our invention is applied to an automatic machine tool of the multiple-spindle screw-machine variety. The machine may thus comprise, at one end, an indexible carrier supporting a plurality of angularly spaced spindles (not shown); the opposite end of the machine may have a power case 10 provided with a plurality of holes 11—12, corresponding in number and in axial alignment with the spindles in the carrier. The power case may also be provided with a table surface or projection 13 (integral with the power case 10) for supporting our improved tool-slide-driving mechanism; the base 14 of our tool-slide-driving mechanism is shown supported directly by the table 13. The machine may also include an end-working tool slide 15, which is shown as a so-called Gridley tool slide and is slidable along a tool-slide arbor or support 16 extending longitudinally of the machine and on the indexing axis of the spindle carrier. Feeding movement for the tool slide 15 is provided basically by a camshaft 17, and for present purposes feeds are derived from two independent cams 18—19 (shown best in Fig. 5a); our novel mechanism combines the programs of these two cams to impart feeding movements to a thrust bar 20, to which a pedestal 21 is secured for purposes of translating feed movements to the slide 15; pedestal 21 may be secured to the rear end of the tool slide 15.

Figure 2:
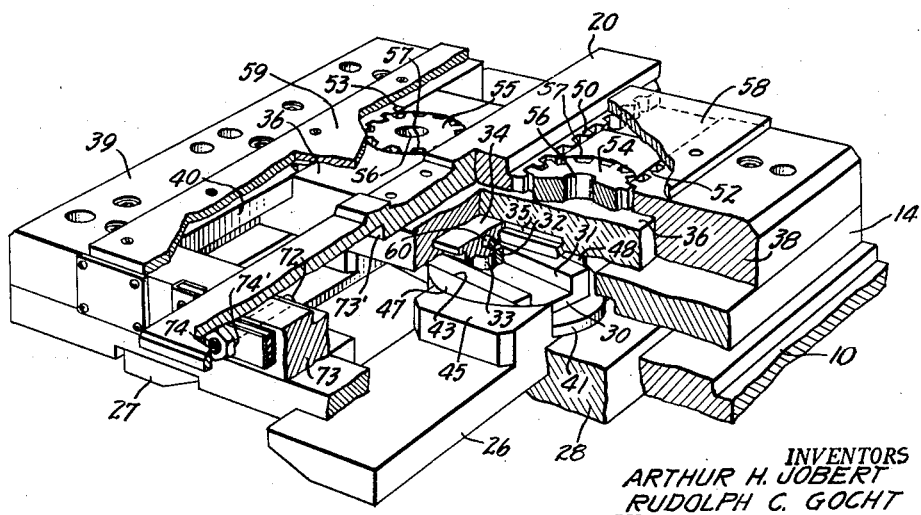
Fig. 2 is a perspective view of important parts of our slide feeding mechanism, with certain elements broken away and in section, in order to reveal the relationship of the parts.

As explained in the said Gocht patent, basic feed motions may be derived from the two cams 18—19 through independent cam-follower rolls 24—25 carried separately by a jump-feed bar 26 and by a work-feed bar 27 longitudinally slidable in fixed elongated guide means 28—29 forming part of the frame of the machine. The combined movements of the jump-feed bar and of the work-feed bar may be resolved by a differential connection comprising a transversely extending connecting member or whiffletree 30, pivotally connected to both feed bars 26—27. The connecting member 30 may include guide means such as an elongated slide 31 for adjustably carrying pivot means from which the combined or differential motion of the two feed bars 26—27 may be transcribed. In the form shown, the pivot means includes a slide block 32 closely fitting and slidable along the guide means 31, and a bore to receive a pivot pin 33 carried by or formed as a part of a second slide block 34. The said second slide block 34 may be dovetailed, or otherwise formed, for slidable retention in further transverse ways, as at 35, in what may be termed a floating slide block 36. The floating block 36 is preferably guided in longitudinally extending ways anchored to the frame and for this purpose our mechanism, when built as a unit as depicted in Fig. 2, may include frame members 38—39 recessed to define the longitudinally extending guide means, as at 40, for the floating slide block 36. The thrust bar 20 to which the tool slide 15 is connected may be accurately guided in its reciprocating motion relative to the slide block 36 by guide surface 36' of the slide block coacting with corresponding guide surface 20' of the thrust bar 20 (see Figs. 3 and 7).

As a feature of the invention, we provide improved pivot connections between the jump-feed bar 26 and the connecting member 30, as well as between the work-feed bar 27 and the connecting member 30. Such pivotal connections feature enlarged bearing members 41—42, respectively (see Figs. 2 and 3). The bearing members 41—42, may be duplicates of each other and may be of diameter substantially exceeding the overall width of the connecting member 30, so that enlarged transverse guide means, such as grooved ways at 43 in bearing member 41 (and at 44 in bearing member 42) may slidably accommodate the connecting member 30. To provide the greatest possible journal support for the bearing members 41—42, we prefer, at least locally in the vicinity of the bearing members, that the feed bars 26—27 shall be of relatively great thickness as indicated by the upstanding masses 45—46, forming part of the jump-feed bar 26 and bolstering or providing longitudinal end support for the bearing segments 47—48 immediately adjacent the connecting member 30. In order to provide a consistent reference for the connecting member 30 with respect to one of the feed bars, we illustrate at 49 (Figs. 1 and 3) the use of a small pin connecting the bottom of the connecting member 30 to the center of bearing 42.

In accordance with a further feature of the invention, our tool-slide feeding mechanism incorporates novel feed-multiplying means assuring complete symmetry of application of thrust forces to the thrust bar 20, for directly feeding the tool slide 15. Basically, the multiplication mechanism comprises frame-fixed rack means, rack means carried by the thrust bar 20, and pinion means meshing with both the fixed and movable racks. For symmetry of thrust application, however, the multiplying means is provided in duplicate and is symmetrically disposed on opposite sides of the thrust bar 20. Thus, the thrust bar 20 may carry, or be formed integrally with, two racks 50—51 on horizontally opposed sides, and frame-fixed racks 52—53 may be horizontally opposed to the movable racks 50—51, respectively, and formed as parts of the frame members 38—39 shown. The multiplying pinions 54—55 may mesh with their respective fixed and movable racks and may be mounted on pins or studs carried by the floating slide block 36. However, in the form shown, no studs are employed; the ends of the teeth of pinions 54—55 are finished to provide a close sliding fit with bearing recesses 56 in block 36, so that the pinions receive direct bearing support from block 36 rather than through stud or pin means. Block 36 may, therefore, in either case be termed a pinion slide block. For purposes which will later be clear, we prefer that the pinions 54—55 shall have open bores, so that, upon simple removal of cover means 58—59, easy finger access may be had to the pinions for changing their engagements with the racks, as desired.

The basic opertaion of the parts thus far described is generally similar to that described in the said Gocht patent; thus, the same two cams 18—19, which may be termed a rapid-advance or jump cam and a tool-feed cam, respectively, may be utilized to produce a wide variety of stroke relationships for the feed of the tool slide 15. By means of a lead screw 60 engaged with the pivot slide block 34, various relationships may be selected for shared combinations of jump-feed and work-feed programs in a given feed stroke. Thus, if the lead screw 60 is adjusted to place the pivot pin 33 on the center of the bearing 42, then the feed for the tool slide 15 will be characterized entirely by the program picked up by the feed bar 27 from the tool or work-feed cam 19. If, on the other hand, the lead screw 60 is adjusted to place the pivot 33 on the center of bearing 41, the program of the rapid-advance or jump-feed cam 18 will govern tool feeding. However, for all intermediate positions, such as those shown, the tool-slide stroke is a differential combination of the two cam programs.

For the case shown in solid lines in Fig. 5b, the pivot 33 has been assumed to be in a central position, so that just as much of the total throw of the tool slide 15 is characterized by a jump feed as by a work feed; thus, during the rise 61 of the jump-feed cam 18, the feed displacement transmitted to the tool slide 15 is as depicted at 62 in Fig. 5b, representing one-half the total stroke for the tool slide 15; during this period the tool or work-feed cam 19 is in a dwell 63. The described rapid feed or jump is followed by a work-feed advance 64, as determined by the rise 65 in the cam 19, and because the pivot 33 has been assumed to be placed halfway between the feed bars 26—27, the extent of the work-feed travel (as represented at 64) equals that of the jump-feed travel 62; during this period of work feeding, the jump cam 18 is in a dwell 66. When work feeding has terminated, the draw-back portions 67—68 of both cams 18—19 are simultaneously effective to produce a quick return 69 for retracting the tool slide 15.

Normally, a machine tool of the character indicated is cammed to provide a standard tool-slide travel of, say, six inches, equal to the distance A—C (see Fig. 7). However, many screw-machine set-ups do not require such a long or standard tool-slide travel. In set-ups where short pieces are being made, obviously a long tool-slide stroke is not necessary, but the range of tool-slide travel must be located adjacent the work spindle noses to eliminate excessive overhang of end-working tools; this is the situation depicted in Fig. 7, to be described in greater detail. Also, when long pieces are being made but where short tool-slide travel is required, it is desirable that the range of the tool-slide stroke be located further away from the spindle noses; this is the situation depicted in Fig. 8, also to be described in greater detail. To obtain the shorter stroke involved in both the indicated alternative set-ups of Figs. 7 and 8, the standard cam 18 may be replaced by a cam which is effective to produce only half the total rise, or three inches, represented by the value X (between locations A—B for the forward position; between locations B—C for the rearward position). In either case, the rear or draw-back position of the floating slide block 36 must always be the same so that the adjusting screw 60 is in axial alignment with an adjustment-access opening 89, hereinafter described in detail.

The two indicated alternative engagements obtained by resetting the pinions 54—55 with respect to the movable racks 50—51 are illustrated in Figs. 7 and 8. It will be seen that the indicated modified engagements permit imparting to the tool slide 15 the same basic relation of jump and feed for a given stroke, but for different selected longitudinal ranges of feeding the tool slide 15. The described flexibility of set-up may be achieved by making the movable rack means 50—51 longer than the fixed rack means 52—53, or at least of an effective length exceeding the maximum rise of cams 18—19. Viewed in another aspect, the length of the fixed racks 52—53 will determine the limit (after multiplication) of total stroke which can be imparted to the tool slide 15, and this will be determined in turn by the rise of the feed cams 18—19. Whatever the factor determining this limiting stroke length, it is our purpose to make the rack means 50—51 substantially longer, as shown in the drawings.

In Fig. 7, the pinions 54—55 are shown meshing with the rear limit of the fixed rack means 52—53, and with a central portion of the movable rack means 50—51. This will mean that for the total stroke imparted by the feed means 18—19, the tool slide 15 will be displaced a given distance X between locations which may be arbitrarily designated A and B. If it is desired, however, that the same feed stroke for the slide 15 shall occur over a different longitudinal range, say backward of the location arbitrarily designated B, then, upon simple removal of the cover plates 58—59, and upon lifting out the pinions 54—55 in order to permit resetting thrust bar 20 to the position shown in Fig. 8, the same total displacement X may be obtained with the same characteristic jump- and work-feed relationship, but between the rearward limiting locations arbitrarily designated B and C. It will be noted for the rearwardly adjusted position of thrust bar 20 in Fig. 8, the pinions 54—55 may engage corresponding limits of both the fixed and movable racks, that is, at the commencement of a feeding stroke. In any case, as noted above, the relation between the pinions and fixed racks 52—53 remains the same regardless of thrust-bar placement.

The described arrangement for quickly resetting pinion engagement will be seen to extend the universality of our tool-slide feeding mechanism; in particular, a given production run may call for a 6-inch stroke with the Gridley slide 15 and, for this purpose, the camshaft 17 may be provided with jump- and work-feed cams 18—19, each having a 3-inch rise. The desired sharing of jump and work feed in the feeding stroke will be a matter of set-up and will be understood to be effected by appropriate adjustment of the lead screw 60, and the 3-inch travel of the pinions 54—55 on the fixed racks 52—53 may represent a limit of feed capacity for the machine. However, for other production runs on the same machine, it may be desired to produce a 3-inch feed travel, as between the points A and B in Fig. 7. For this purpose, cams 18—19 may be provided with 1.5-inch rises, and pinions 54—55 may be set in the relationship shown in Fig. 7. If the solid-line profile of Fig. 5b is taken to represent the tool slide-feed program for an assumed 6-inch stroke, then the dot-dash program 70 will be understood to represent that slide-feed program which will obtain for an adjustment as just described for Fig. 7. For the adjustment depicted in Fig. 8, wherein 1.5-inch cams may also be assumed to be used, the resulting feed program will be as depicted at 71 in Fig. 5b.

Whatever the cam-feed program, and whatever the adjustment of the pivot 10 by means of a lead screw 60, the forward position of the pinion slide block 36 (that is, at the end of the rise of both cams 18—19) may always be the same; therefore, in order to avoid any ambiguity in the attainment of the final and most forwardly fed position, we may provide stop means 72 (Fig. 2) secured to a frame member 73 and projecting to intercept a part 73′ formed in or carried by the thrust bar 20. In the form shown, limiting abutment is taken against a shoulder or wall 73′ forming part of the thrust bar 20, and locking screw 74 and lock nut 74′ permit external access for adjustably selecting the limiting forward feed position, as will be understood; of course, when the machine is cammed for a three-inch stroke instead of a six-inch stroke, a longer stop screw 74 may be required, particularly for the set-up depicted in Fig. 8.

As indicated generally above, we also provide improved means for adjusting our tool-slide feed mechanism and featuring safety lock-out connections to clutch elements of the machine. Referring particularly to Figs. 3 and 4, the machine may include a feed clutch for selectively connecting the machine drive to the camshaft 17. Such mechanism may include a shift fork 75 (shown partly broken away in Fig. 3) carried by an actuating rod 76, which may be translated transversely of the machine upon actuation by a shift arm 77 carrying a roll 78 engaging a transverse slot 79 in rod 76. The arm 77 may form part of a manual clutch-operating mechanism not shown in further detail. For purposes of safety lock-out, it may merely be necessary that an abutment be provided on a part of the clutch mechanism, as, for example, by securing an interfering bolt 80 to a part of the rod 76 so that bolt 80 may project outwardly for interference with, or for no interference with, a ledge 81 on a lock-out lever 82 pivoted at 83 to the frame of the machine. In the position shown in solid outline in Fig. 3, the interfering abutment 80 is set for interference with the lock-out lever 82, and this position preferably represents engagement of the main drive to the camshaft 17. It will be understood that, for the non-interfering position shown in dotted outlines 80′ in Fig. 3, the camshaft clutch has been disengaged, and that the lock-out lever 82 can then be pivoted to the position shown in dotted outline in Fig. 4.

In the form shown, the lock-out connection between abutment 80 and the adjustable mechanism for lead screw 60 is achieved through a push pin 84 coacting with a short pin or projection 85 carried by lock-out lever 82, and through a coaction between push pin 84 and an interfering end or abutment 86 on an adjustment access arm 87, which is also pivoted to the frame, as at 88. The arm 87 may serve the normal function of effectively covering up or closing an adjustment-access opening 89 in the frame member 38 of our tool-slide mechanism, and the opening 89 is preferably aligned with the lead screw 60 only when the pinion slide 36 (to which the lead screw 60 is basically referenced) is in a fully retracted or rearward position.

For purposes of assuring that the access opening 89 will be completely closed when adjustment access is to be denied, the arm 87 may carry a displaceable cover member 90 with sealing means 91, and with spring means 92 urging the same into covering position. A knob 93 may serve to remove the cover against the action of spring 92 whenever access to the opening 89 is desired. Preferably this access is only possible upon counterclockwise rotation of the arm 87 in the sense depicted in Fig. 4; therefore, means such as a stop pin 94 may be positioned to interfere with attempted clockwise movement of the cover 90. The push pin 84 may normally be urged by spring means 95 for projection to the position shown in solid outlines in Fig. 4. In this position pin 84 interferes with counter-clockwise rotation of the arm 87 and, therefore, access is denied to the adjustment opening 89. It will be noted, furthermore, that in this position the lockout lever 82 is permitted to rock counter-clockwise, thus retracting the ledge 81 from interfering relation with the abutment 80 on the clutching rod 76.

Under the described conditions, that is, with arm 87 in the position shown in full in Fig. 4, the camshaft clutch may be actuated, and the machine may be driven as long as the camshaft clutch is engaged; bolt 80 will be in the position shown in full in Fig. 3, so as to prevent clockwise rotation of lever 82 and so as to prevent displacement of push pin 84 or removal of cover 90 over the access opening 89. Once the camshaft has been declutched, which may have been effected by automatic means not shown and at a time when the cam followers 24—25 have been fully retracted, the interfering bolt 80 will have been removed (to position 80') from interfering relation with the ledge 81. The lock-out lever 82 may then be actuated in the clockwise direction upon manually depressing the push pin 84, and the depressed position of push pin 84 will be held by abutment 86 on arm 87 after removal of cover 90, at which time the parts will assume the relationship shown in dotted lines in Fig. 4.

As a further safety feature, we have provided means, such as an extension 82' on the lock-out lever 82, in order to assure that the camshaft 17 may not even be driven manually while an adjustment is being made through access opening 89. In machines of the character indicated, externally accessible means are provided for manually rotating the camshaft, as for use in set-up operations when it is desired to calibrate tool positions for various parts of the feeding cycle. In the machine shown, such adjustment is effected through a transverse shaft 96 which may be connected to a hand crank (not shown), and which may incorporate a pinion for manually driven engagement with a gear fixed to the main drive (not shown) for the camshaft 17. The handcrank shaft 96 may be held in either cranking or disengaged position by a spring-pressed plunger (not shown), which also locks the hand-crank shaft out when the feed clutch of the machine is engaged.

The hand-crank shaft 96 must also be locked out when the manual-adjusting means is inserted into the access opening 89. To accomplish this, the end of the hand-crank shaft 96 may be formed with a reduced portion 97 for reception of the end 82' of the lock-out lever 82, when it is in the dotted-line position shown in Fig. 4; the reduced portion 97 will be seen to provide a shoulder for interception by lever end 82' when in the dotted-line position of Fig. 4, thereby preventing engagement of the hand-crank shaft 96 as long as adjustment of screw 60 is being made. When the hand crank 96 is engaged for manual rotation of the camshaft, the full diameter of the crankshaft lies beneath the end 82' of arm 82, and clockwise rotation of arm 82 will be denied, so that access to the adjustment 89 will also be denied. When manual rotation of the camshift has been completed, the hand crank 96 is disengaged, and it will again be possible to displace lock-out lever 82 in the clockwise direction, provided, as previously explained, that the feed-clutch rod 76 is also in the disengaged position.

Once the access opening 89 has been uncovered, and when the pinion slide block 36 is in the fully retracted position, manual-adjustment means may be inserted in the access opening 89 for engagement with the lead screw 60. For this purpose, we have shown lead screw 60 provided with a squared or hexagonal head 98 which may be engaged with a correspondingly shaped socket 99 at the end of an elongated shank 100; shank 100 may form part of manual-adjustment means including an actuating handle or crank 101. The described manual-adjustment means 100 alone is, of course, sufficient to effect adjustment, but for purposes of ascertaining the extent of adjustment, we incorporate with means 100 a calibrated scale for directly indicating the transverse placement of the pivot 33. The scale may be engraved, as at 102, along the outside of a tubular member 103, in which the socket 99 is slidable; and tubular member 103 may extend all the way in for abutment with the pivot slide block 34 (as shown in Fig. 6). The depth of setting of pin 33 will then be read by observing the face of cover plate 104 against the scale 102, and for the adjustment shown in Fig. 6, a setting just beyond 2.5 inches is indicated; this indicates that the universal cam mechanism has been set for a 2.5-inch feed with a 3.5-inch jump, assuming a 6-inch stroke.

For purposes of assuring a better unit-handling relationship, the shank 100 of the adjustment means may be slidable in a guide boss 105 secured to the outer end of the tube 103, and spring means 106 urged between boss 105 and a snap ring or other abutment means 107 on shank 100 may serve to hold the graduated scale firmly against the pivot slide block 34, as long as a pivot adjustment is being made. Having completed the adjustment, the tool 101 may be removed and cover 90 replaced upon clockwise rotation of arm 87. As soon as abutment 86 drops out of interfering relation with push pin 84, the push pin will snap back into the safety position shown in full lines in Fig. 4, and all lockouts will be cleared to permit resumption of camshaft rotation.

It will be seen that we have provided an improved slide-actuating mechanism featuring safety and ease of adjustment over that characterizing earlier constructions. At the same time, the load capacity of slide mechanisms of the character indicated has been substantially increased, as has also the range of application and adjustment of the mechanism.

While we have described the invention in detail for the preferred form shown, it will be understood that modifications may be made within the scope of the invention as defined in the claims which follow.

We claim:

1. In a machine of the character indicated, a frame including elongated guide means, a tool-slide feed member guided in said guide means and having a transversely extending pivot guide, a jump-feed bar and a work-feed bar with independent feed means for said bars, a connecting member pivotally connected to each of said feed bars, a pivot member engageable in said transverse guide and transversely adjustable along said connecting member, externally accessible adjusting means for adjustably setting said pivot member transversely along said connecting member, said adjusting means being normally disengaged from adjusting relation with said pivot member, drive means including a feed clutch for connecting said drive means to said independent feed means, actuating means for said feed clutch, and a safety lock-out connection between said adjusting means and said clutch-actuating means, whereby said pivot member may not be adjusted as long as said clutch is engaged.

2. In a machine of the character indicated, a frame including elongated guide means, a tool-slide feed member guided in said guide means and having a transversely extending pivot guide, a jump-feed bar and a work-feed bar with independent feed means for said bars, a connecting member pivotally connected to each of said feed bars, a pivot member engageable in said transverse guide and transversely adjustable along said connecting member, externally accessible adjusting means for adjustably setting said pivot member transversely along said connecting member, said adjusting means being normally disengaged from adjusting relation with said pivot member, jump-feed and work-feed cams for driving said feed bars, manual means for driving said cams, a clutch for connecting said manual means to said cams, and a safety lock-out connection between said clutch and said adjustable means, whereby said cams may not be manually actuated as long as said adjusting means is engaged to said pivot, and whereby said pivot may not be adjusted as long as said manual means is connected in actuating relation with said cams.

3. In a universal cam-mechanism of the character indicated, frame means including elongated guide means, a slide-feeding member guided by said guide means and including a transverse guide, jump-feed means and work-feed means and drive means including a clutch for connecting a drive to said feed means, a connecting member differentially connected to said jump-feed means and to said work-feed means, pivot means guided for movement along said connecting member and guided by said transverse guided, lead-screw positioning means for transversely positioning said pivot means, said frame having an access opening aligned with said lead-screw means only when both said feed means are in fully retracted position, and safety lock-out means including a removable cover for said opening and interlocked with said clutch.

4. A machine according to claim 3, in which said safety lock-out means includes an arm pivoted to said frame means, said arm carrying said cover at one end thereof, and interfering means reacting between said clutch and said arm to prevent access to said opening as long as said clutch is engaged.

5. A machine according to claim 3, in which said lead screw includes removable adjusting means therefor, said removable adjusting means comprising an elongated tube of bore exceeding the diameter of said lead screw, whereby said tube may directly abut said pivot means, an external longitudinally graduated scale on said tube, whereby the placement of said pivot means within said frame may be observed on said scale at the outer edge of said opening, wrench means including a head removably engageable with said lead screw and carried within said tube, and an actuating shank for said wrench means extending through the outer end of said tube and longitudinally slidable with respect thereto.

6. In a mechanism of the character indicated, elongated guide means, a slide guided by said guide means, a pair of transversely spaced feed bars, separate bearings carried by each of said feed bars and including a substantial cylindrical surface journaled in each of said feed bars, transverse guide means in each of said bearings, a connecting member extending between said feed bars and guided in the guide means of both bearings, and a pivotal connection to said slide from a point on said connecting member.

7. In a mechanism of the character indicated, generally horizontally disposed elongated guide means, a slide guided by said guide means, a feed member for said slide and including two generally horizontally opposed racks fixed to said slide, a floating-block member, guide means oriented parallel to said first-mentioned guide means for slidably guiding said floating-block member and so located relatively to said first-mentioned guide means that laterally opposed parts of said floating-block member are respectively adjacent said opposed racks, two laterally opposed pinion-bearing means on said floating-block member and respectively located at said laterally-opposed parts, two like pinions respectively meshing with said racks and respectively located by said bearing means, each of said pinion-bearing means being on substantially a vertical axis and having a seat for gravity-retention of the pinion inserted therein, two further laterally opposed racks in fixed generally parallel relation to said guide means and respectively engaged to the pinion adjacent thereto, said first-mentioned racks substantially exceeding the length of said second-mentioned racks, and feed means for said floating-block member, whereby said pinions may be lifted vertically from said bearing means and from engagement with said racks to permit selective initial relative longitudinal placement of said first-mentioned racks with respect to said second-mentioned racks and subsequent relocation of said pinions on said bearing means, so that the total feed displacement of said slide may be caused to occur for different longitudinal ranges of said guide means.

References Cited in the file of this patent

UNITED STATES PATENTS

| | | |
|---|---|---|
| 1,640,655 | Hartman | Aug. 30, 1927 |
| 2,369,039 | Gocht | Feb. 6, 1945 |